(12) United States Patent
Ikuta et al.

(10) Patent No.: US 9,709,931 B2
(45) Date of Patent: Jul. 18, 2017

(54) EXCESSIVE HEATING PROTECTION CIRCUIT AND IMAGE FORMING APPARATUS

(71) Applicant: Konica Minolta, Inc., Chiyoda-ku, Tokyo (JP)

(72) Inventors: Katsuyuki Ikuta, Hamamatsu (JP); Takeshi Tamada, Toyohashi (JP); Yoshihito Sasamoto, Hachioji (JP); Hiroshi Eguchi, Toyohashi (JP)

(73) Assignee: KONICA MINOLTA, INC, Tokyo (JP)

( * ) Notice: Subject to any disclaimer, the term of this patent is extended or adjusted under 35 U.S.C. 154(b) by 0 days.

(21) Appl. No.: 15/227,336

(22) Filed: Aug. 3, 2016

(65) Prior Publication Data

US 2017/0038708 A1 Feb. 9, 2017

(30) Foreign Application Priority Data

Aug. 6, 2015 (JP) .................................. 2015-155796

(51) Int. Cl.
G03G 15/20 (2006.01)
H02H 5/04 (2006.01)

(52) U.S. Cl.
CPC .......... G03G 15/2017 (2013.01); H02H 5/042 (2013.01)

(58) Field of Classification Search
CPC ........................... G03G 15/2017; H02H 5/042
USPC .......................................................... 399/33
See application file for complete search history.

(56) References Cited

U.S. PATENT DOCUMENTS

| 4,994,852 A * | 2/1991 | Matsuuchi | G03G 15/2039 219/216 |
| 2008/0181632 A1 * | 7/2008 | Kim | G03G 15/2039 399/33 |

FOREIGN PATENT DOCUMENTS

| JP | 09022218 A | 1/1997 |
| JP | 2007279636 A | 10/2007 |
| JP | 2014077847 A | 5/2014 |

* cited by examiner

*Primary Examiner* — Hoang Ngo
(74) *Attorney, Agent, or Firm* — Cantor Colburn LLP

(57) ABSTRACT

An excessive heating protection circuit to be connected to a first temperature sensor being configured to output less voltage with a rise in temperature and a second temperature sensor being configured to output more voltage with a rise in temperature. The excessive heating protection circuit includes: a multiplexer having a plurality of channels capable of receiving reference voltages predetermined for the first and second temperature sensors, the multiplexer being configured to output one of the reference voltages by selecting one of the channels with reference to input selection signals; a first comparator being configured to compare the output voltage of the first temperature sensor to the output reference voltage of the multiplexer and to output a comparison result; and a second comparator being configured to compare the output voltage of the second temperature sensor to the output reference voltage of the multiplexer and to output a comparison result.

20 Claims, 9 Drawing Sheets

EXCESSIVE HEATING PROTECTION CIRCUIT AND IMAGE FORMING APPARATUS

This application claims priority under 35 U.S.C. §119 to Japanese Patent Application No. 2015-155796 filed on Aug. 6, 2015, the entire disclosure of which is incorporated herein by reference in its entirety.

BACKGROUND OF THE INVENTION

Field of the Invention

The present invention relates to: an excessive heating protection circuit for a fusing portion; and an image forming apparatus having the same.

Description of the Related Art

The following description sets forth the inventor's knowledge of related art and problems therein and should not be construed as an admission of knowledge in the prior art.

As is well-known, a fusing portion is provided with a heat roller and a pressure roller that jointly form a nip area for fusing.

A print medium with unfused toner thereon is conveyed to the nip area for fusing. When the print medium passes through the nip area for fusing, the heat roller and the pressure roller apply heat and pressure, respectively, to the print medium. The toner is firmly fused onto the print medium accordingly.

In order not to excessively heating (overheating) the heat roller, the fusing portion is further provided with a temperature sensor that detects the temperature of the heat roller and outputs an analog voltage indicating a detected result. This output voltage is input to an excessive heating protection circuit that is mounted on a controller circuit substrate of an image forming apparatus. A reference voltage defining excessive heating of the heat roller is also input to this excessive heating protection circuit. Commonly, reference voltages are obtained by dividing supply voltage, i.e., constant voltage Vcc, with resistors. The excessive heating protection circuit compares the input temperature signal to the reference voltage with a comparator. With reference to a comparison result, the excessive heating protection circuit is allowed to protect the image forming apparatus from excessive heating (refer to Japanese Unexamined Patent Publication No. H09-022218 and No. 2014-077847, for example).

The fusing portion may be provided with a plurality of temperature sensors. These temperature sensors do not all necessarily have the same specifications. This means, these temperature sensors may be built to output voltage having different temperature characteristics, for example. In this case, suitable reference voltages for these temperature sensors need to be predetermined. Reference voltages are most commonly obtained by dividing voltage with resistors, as described above. So, the manufacturer of the image forming apparatus needs to prepare voltage-dividing resistors having a resistance value that is different depending on the excessive heating protection circuit. Furthermore, the manufacturer's image forming apparatuses may use different types of temperature sensors depending on the model. In this case, the manufacturer also needs to prepare different types of excessive heating protection circuit depending on the model. This means, the manufacturer needs to prepare many types of substrate for the excessive heating protection circuits, and inventory control for all these substrates is extremely costly to the manufacturer.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to an excessive heating protection circuit for protecting a fusing portion from excessive heating, the excessive heating protection circuit to be connected to a first temperature sensor and a second temperature sensor, the first temperature sensor being configured to output less voltage with a rise in temperature, the second temperature sensor being configured to output more voltage with a rise in temperature, the excessive heating protection circuit including:

a multiplexer having a plurality of channels, the channels being capable of receiving reference voltages predetermined for the first temperature sensor and the second temperature sensor, the multiplexer being configured to output one of the reference voltages by selecting one of the channels with reference to input selection signals;

a first comparator having a first non-inverting input terminal being capable of receiving the output voltage of the first temperature sensor and a first inverting input terminal being capable of receiving the output reference voltage of the multiplexer, the first comparator being configured to compare the output voltage of the first temperature sensor to the output reference voltage of the multiplexer and to output a comparison result; and a second comparator having a second inverting input terminal being capable of receiving the output voltage of the second temperature sensor and a first non-inverting input terminal being capable of receiving the output reference voltage of the multiplexer, the second comparator being configured to compare the output voltage of the second temperature sensor to the output reference voltage of the multiplexer and to output a comparison result, wherein the comparison result output by the first comparator and the comparison result output by the second comparator both indicate Hi under normal temperature conditions and both indicate Lo in the event of excessive heating.

A second aspect of the present invention relates to an image forming apparatus including an excessive heating protection circuit for protecting a fusing portion from excessive heating, the excessive heating protection circuit to be connected to a first temperature sensor and a second temperature sensor, the first temperature sensor being configured to output less voltage with a rise in temperature, the second temperature sensor being configured to output more voltage with a rise in temperature, the excessive heating protection circuit including:

a multiplexer having a plurality of channels, the channels being capable of receiving reference voltages predetermined for the first temperature sensor and the second temperature sensor, the multiplexer being configured to output one of the reference voltages by selecting one of the channels with reference to input selection signals;

a first comparator having a first non-inverting input terminal being capable of receiving the output voltage of the first temperature sensor and a first inverting input terminal being capable of receiving the output reference voltage of the multiplexer, the first comparator being configured to compare the output voltage of the first temperature sensor to the output reference voltage of the multiplexer and to output a comparison result; and a second comparator having a second inverting input terminal being capable of receiving the output voltage of the second temperature sensor and a second non-inverting input terminal being capable of receiving the output reference voltage of the multiplexer, the second comparator being configured to compare the output voltage of the second temperature sensor to the output reference voltage of the multiplexer and to output a comparison result, wherein the comparison result output by the first comparator and the comparison result output by the second comparator both indicate Hi under normal temperature conditions and both indicate Lo in the event of excessive heating.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which.

DETAILED DESCRIPTION OF THE PREFERRED EMBODIMENTS

Figure 1:
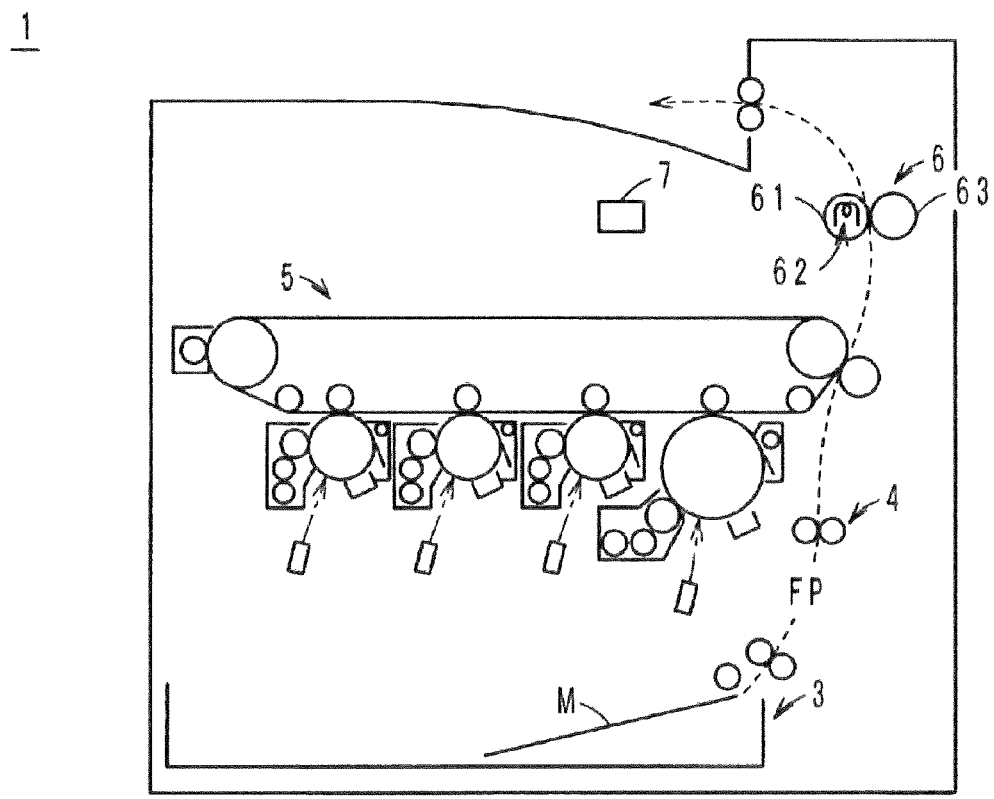
FIG. 1 is a view illustrating a comprehensive configuration of an image forming apparatus.

In the following paragraphs, some preferred embodiments of the invention will be described by way of example and not limitation. It should be understood based on this disclosure that various other modifications can be made by those in the art based on these illustrated embodiments.

First Section: Comprehensive Configuration and Print Operation of the Image Forming Apparatus FIG. 1 relates to an image forming apparatus 1 that is a copier, a printer, a facsimile, or a multifunctional machine having copier, printer, and facsimile functions, for example. The image forming apparatus 1 prints an image on a sheet-like print medium M (print paper, for example). The image forming apparatus 1 is essentially provided with a paper feeding portion 3, a pair of paper stop rollers 4, an image forming portion 5, a fusing portion 6, and a controller portion 7. These portions perform operations as described below when the image forming apparatus 1 performs printing.

Blank print mediums M are loaded on the paper feeding portion 3. The paper feeding portion 3 transfers print mediums M one by one to a conveyor path FP indicated by a dashed line in FIG. 1. The pair of paper stop rollers 4 is disposed along the conveyor path FP in the downstream of the paper feeding portion 3. The pair of paper stop rollers 4 briefly stops moving to stop a print medium M received from the paper feeding portion 3 then starts moving again to direct it to a second transfer area at a predetermined timing.

The image forming portion 5 forms toner images on an intermediate transfer belt by a well-known method such as a tandem electro-photographic print method. The intermediate transfer belt carries the toner images to the second transfer area.

While the print medium M arrives at the second transfer area from the pair of paper stop rollers 4, the toner images arrive at the second transfer area from the image forming portion 5. At the second transfer area, the toner images are transferred onto the print medium M from the intermediate transfer belt.

The fusing portion 6 is provided with a heat roller 61 and a pressure roller 63 that jointly form a nip area by contact with each other. The heat roller 61 has a built-in heater 62 in its cylindrical cored bar. The heater 62 is a halogen heater, for example, and is turned on with alternating current supplied from a power circuit 8 (to be later described). The pressure roller 63 rotates under the control of the controller portion 7. The heat roller 61 rotates as driven by the pressure roller 63. At the nip area, the heat roller 61 and the pressure roller 63 both apply pressure to the print medium M, and the heat roller 61 further applies heat to the print medium M. The toner images are fixed on the print medium M accordingly. The heat roller 61 and the pressure roller 63 then transfer the print medium M to a paper receiving tray.

The controller portion 7 has a microcomputer that executes programs stored on a non-volatile memory such as a ROM while using a main memory as a work area. The controller portion 7 performs various control operations including controlling voltage delivery to the heater 62.

Second Section: Block Configuration of a Fuser Temperature Monitoring Device

Figure 2:
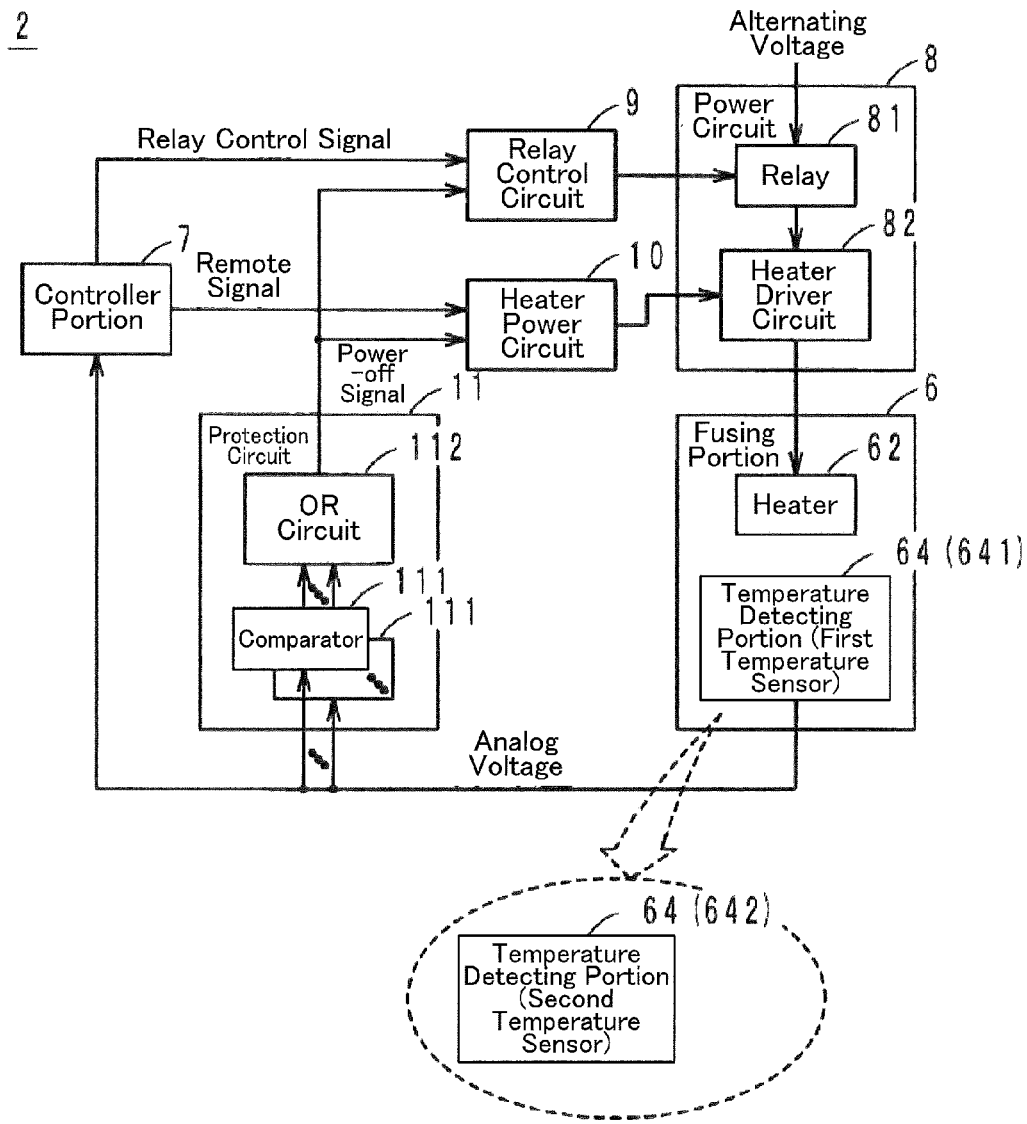
FIG. 2 is a view illustrating a configuration of a fuser control device.

To monitor the temperature of the heat roller 61 (i.e., fuser temperature), the image forming apparatus 1 is provided with a fuser temperature monitoring device 2. As illustrated in FIG. 2, the fuser temperature monitoring device 2 is provided with the fusing portion 6, the controller portion 7, the power circuit 8, a relay control circuit 9, a heater power circuit 10, and an excessive heating protection circuit (hereinafter referred to as a "protection circuit" for short) 11.

The power circuit 8 includes a relay 81 and a heater driver circuit 82. The relay 81, which is disposed on a power-supply line, turns on and off alternating voltage supply to the heater 62 with a relay control signal coming through the relay control circuit 9 from the controller portion 7. The heater driver circuit 82 is comprised of a triac, for example. Receiving the alternating voltage through the relay 81, the heater driver circuit 82 turns on and off alternating voltage supply to the heater 62 in accordance with a remote signal coming through the heater power circuit 10 from the controller portion 7. The heater 62 is thus allowed to be turned on to heat the heat roller 61.

Figure 3:
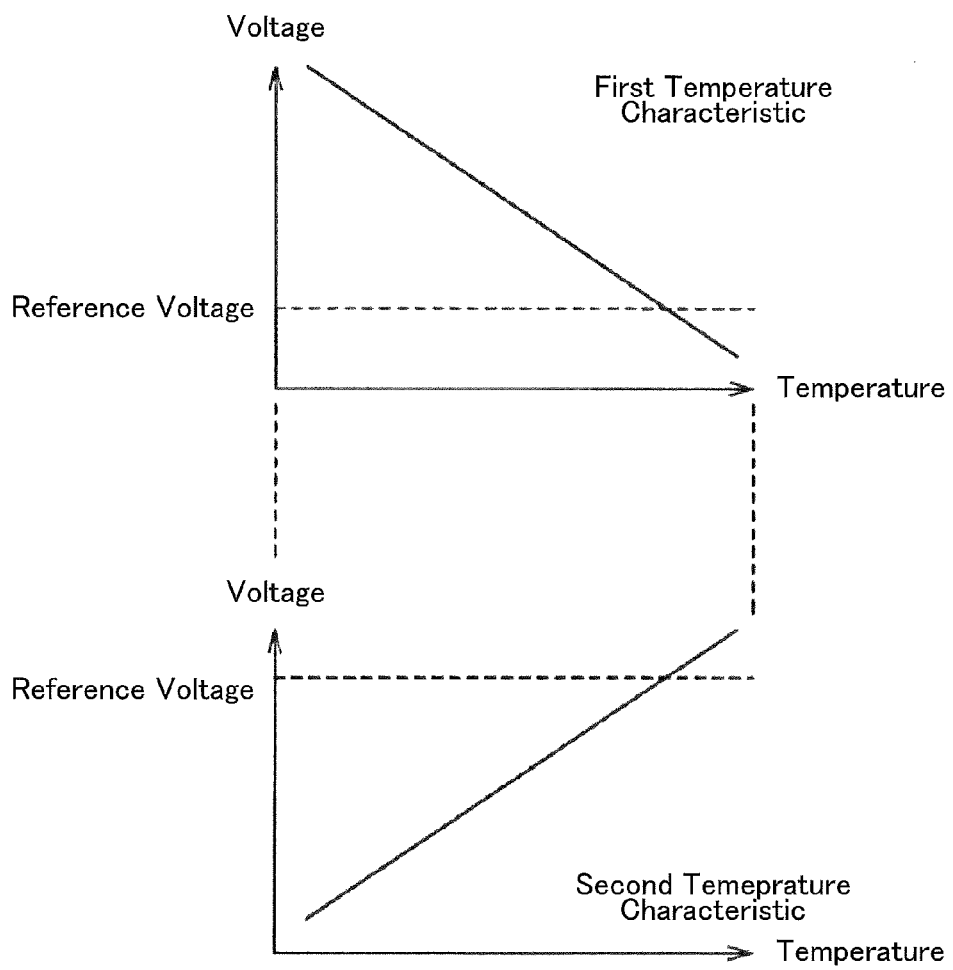
FIG. 3 illustrates schematic line charts indicating the temperature characteristics of the output voltages of a first temperature sensor and a second temperature sensor.

The fusing portion 6 is further provided with at least one temperature detecting portion 64 in addition to the components illustrated in FIG. 1. The temperature detecting portion 64 includes a first temperature sensor 641 that is a thermistor connected to a constant-voltage source (not shown in this figure) through a pull-up resistor, for example. The first temperature sensor 641 outputs voltage having a specific temperature characteristic (hereinafter referred to as a "first temperature characteristic"): the output voltage decreases as the ambient air is heated (i.e., with a rise in temperature) as indicated by the upper line chart in FIG. 3. The temperature detecting portion 64, which is disposed adjacent to the heat roller 61, detects the temperature of the heat roller 61 (i.e., fuser temperature) and transfers an analog voltage indicating a detection result, to the controller portion 7 and the protection circuit 11. With reference to the output voltage from the temperature detecting portion 64, the controller portion 7 generates a remote signal to adjust the fuser temperature to the target temperature and transfers it to the heater power circuit 10.

The temperature detecting portion 64 may include, instead of the first temperature sensor, a second temperature sensor 642 as shown in a dashed ellipse in FIG. 2, which is a non-contact temperature sensor (hereinafter referred to as an "NC sensor") such as an infrared sensor or a thermopile, for example. The second temperature sensor 642 outputs voltage having a specific temperature characteristic (hereinafter referred to as a "second temperature characteristic"): the output voltage increases with a rise in temperature, as indicated by the lower line chart in FIG. 3.

The temperature detecting portion 64 may alternatively include a combination of the first temperature sensor 641 and the second temperature sensor 642.

To prevent the temperature of the heat roller 61 from exceeding a predetermined target temperature, the protection circuit 11 has more than one comparator 111 and more than one OR circuit 112. Each comparator 111 receives both an output voltage of the temperature detecting portion 64 and a reference voltage defining the upper limit on the temperature of the heat roller 61 (approximately 240 to 250 degrees Celsius). Commonly, reference voltages are obtained by dividing constant voltage Vcc with resistors. Each comparator 111 compares the output voltage to the reference voltage and transfers a comparison result to its OR circuit 112. The OR circuit 112 performs a logical operation with the comparison results from the comparators 111 and transfers a signal for turning off power delivery (hereinafter referred to as a "power-off signal") to both the relay control circuit 9 and the heater power circuit 10. The configuration and operations of the protection circuit 11 will be later described in details. In response to the power-off signal, the relay control circuit 9 turns off alternating voltage supply to the heater 62 by opening the contact of the relay 81. In response to the power-off signal, the heater power circuit 10 stops transferring a remote signal to the heater driver circuit 82.

Third Section: Detailed Description of Technical Problems

Figure 4:
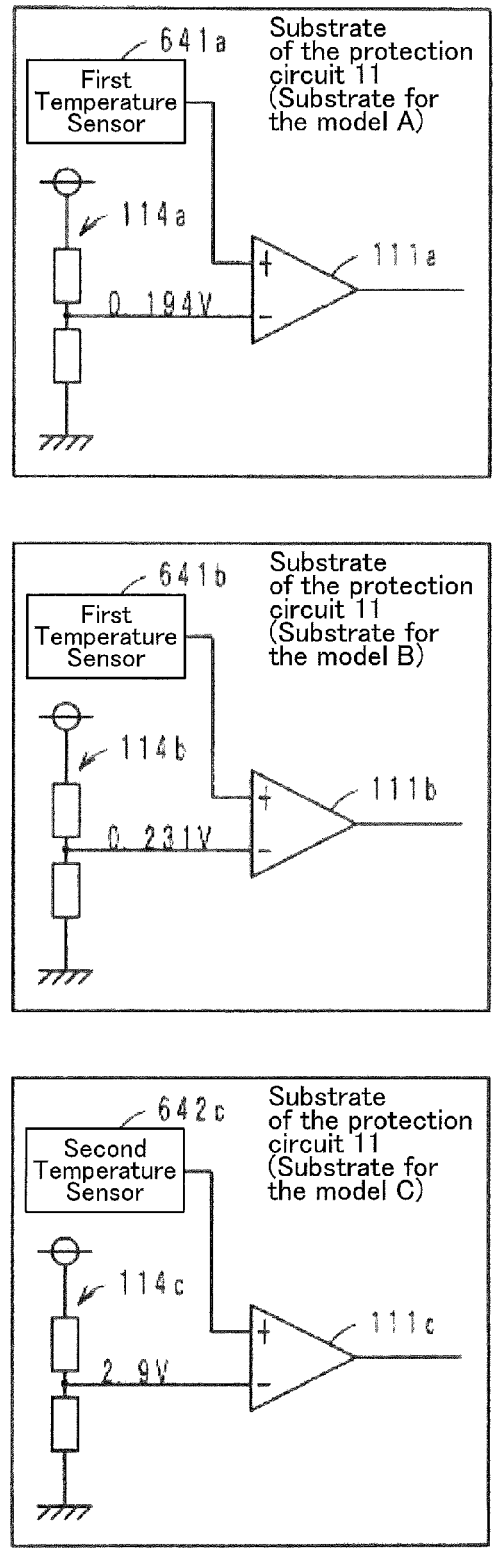
FIG. 4 illustrates substrate examples of the protection circuit 11 for different models.

The temperature detecting portion 64 includes either or both of the first temperature sensor 641 and the second temperature sensor 642 as described above. The manufacturer's image forming apparatuses may use temperature sensors having different temperature characteristics depending on the model. FIG. 4 illustrates a first temperature sensor 641*a* used in the image forming apparatus 1 of model A, a first temperature sensor 641*b* used in the image forming apparatus 1 of model B, and a second temperature sensor 642*c* used in the image forming apparatus 1 of model C, for example. The reference voltage is set to 0.194V for the first temperature sensor 641*a*, se to 0.231V for the first temperature sensor 641*b*, and set to 2.9V for the second temperature sensor 642*c*, for example. In this case, the manufacturer of the image forming apparatus 1 need to prepare different types of voltage divider circuits 114*a*, 114*b*, and 114*c* depending on the model. This means, they also need to prepare many types of protection circuit substrates. This is undesirable to the manufacturer because inventory control for all these substrates is costly. To solve this problem, the inventor of the subject application has conceived the protection circuit 11 illustrated in FIG. 5.

Fourth Section: Configuration Example of Protection Circuit

Figure 5:
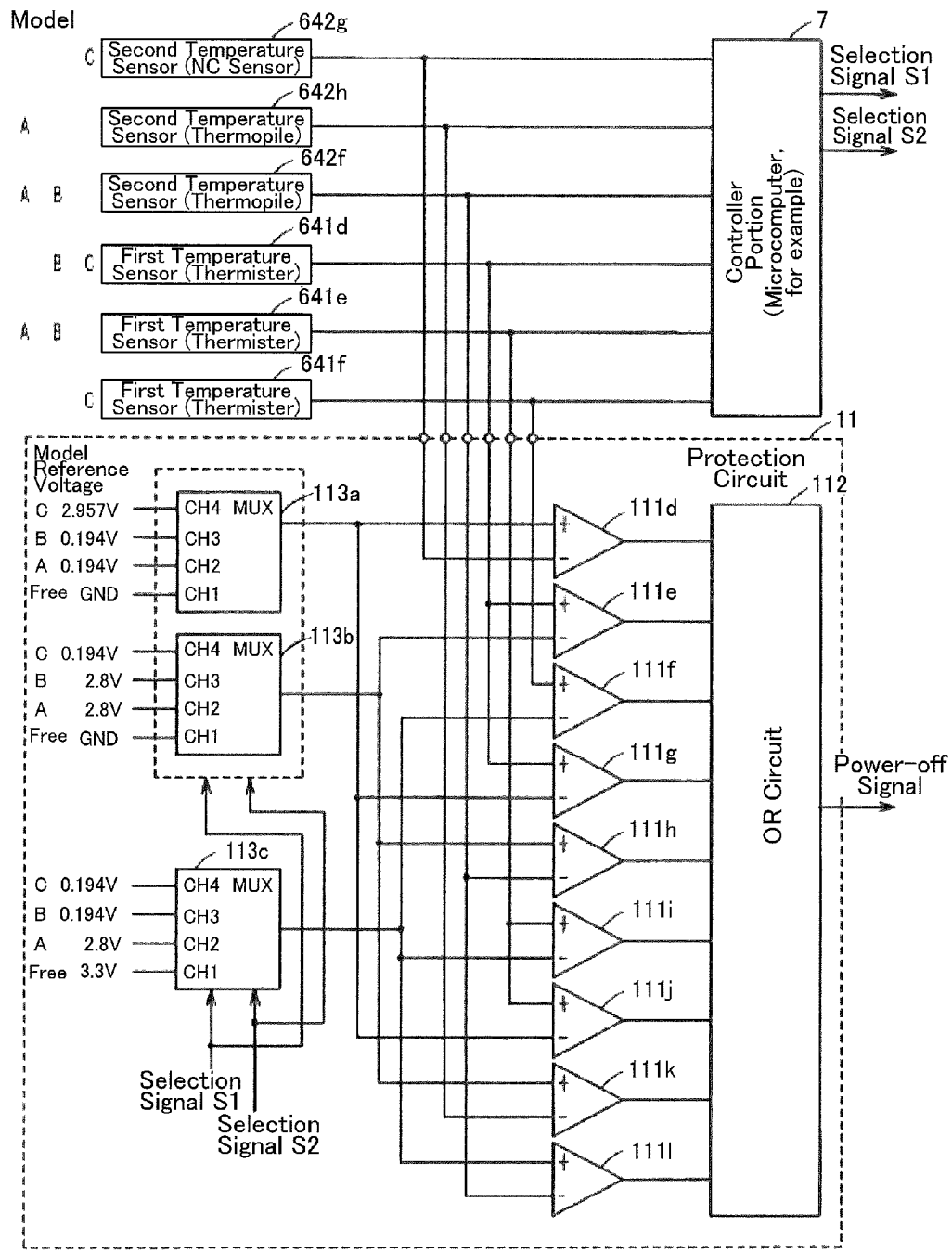
FIG. 5 is a view illustrating a configuration of a protection circuit according to one embodiment of the present invention.

In the example of FIG. 5, the protection circuit 11, which is mounted on one substrate, compares analog voltages from as many as six temperature sensors of three types, i.e., the first temperature sensors 641 and the second temperature sensors 642, to the respective reference voltages. If the fuser temperature exceeds the upper limit, the protection circuit 11 transfers a power-off signal as described above to both the relay control circuit 9 and the heater power circuit 10 illustrated in FIG. 2.

In the fourth section, the model A has one first temperature sensor (thermistor) 641*e* and two second temperature sensors (thermopiles) 642*h* and 642*f*. The model B has one second temperature sensor (thermopile) 642*f* and two first temperature sensors (thermistors) 641*d* and 641*e*. The model C has two first temperature sensors (thermistors) 641*d* and 641*f* and one second temperature sensor (NC sensor) 642*g*. The substrate of the protection circuit 11 is configured to be connected to the six temperature sensors of the three types, i.e., the first temperature sensors 641 and the second temperature sensors 642.

The protection circuit 11 is provided with as many as three multiplexers (hereinafter referred to as "MUXs"), i.e., a first MUX 113*a*, a second MUX 113*b*, and a third MUX 113*c*. The MUXs 113*a* to 113*c* each have as many as four input channels, for example, i.e., channels CH1 to CH4. In the fourth section, the same channels of the MUXs 113*a* to 113*c* are uniquely (exclusively) allocated to three reference voltages used in one specific model. With regard to the model A, for example, the channel CH2 of the MUX 113*a* is allocated to 0.194V, a reference voltage predetermined for the first temperature sensor 641*e*; the channel CH2 of the MUX 113*b* is allocated to 2.8V, a reference voltage predetermined for the second temperature sensor 642*h*; and the channel CH2 of the MUX 113*c* is allocated to 2.8V, a reference voltage predetermined for the second temperature sensor 642*f*. With regard to the models B and C, see Table 1 below.

TABLE 1

Channels Allocated to Reference Voltages

| | CH | | | |
|---|---|---|---|---|
| MUX | 1 (Free Channel) | 2 (Model A) | 3 (Model B) | 4 (Model C) |
| 113a | GND | 0.194 V (Sensor 641e) | 0.194 V (Sensor 641d) | 2.957 V (Sensor 642g) |
| 113b | GND | 2.8 V (Sensor 642h) | 2.8 V (Sensor 642f) | 0.194 V (Sensor 641d) |
| 113c | 3.3 V | 2.8 V (Sensor 642f) | 0.194 V (Sensor 641e) | 0.194 V (Sensor 641f) |

As is understood from the table above, the channels CH1 are not allocated to reference voltages used in any model. All the channels CH1 may be kept free rather than being allocated to some voltages. In the fourth section, however, the channels CH1 of the MUXs 113a and 113b are allocated to 0V, and the channel CH1 of the MUX 113c is allocated to 3.3V. This allows quickly detecting incorrect identification of model, which will be later described in details.

Figure 6:
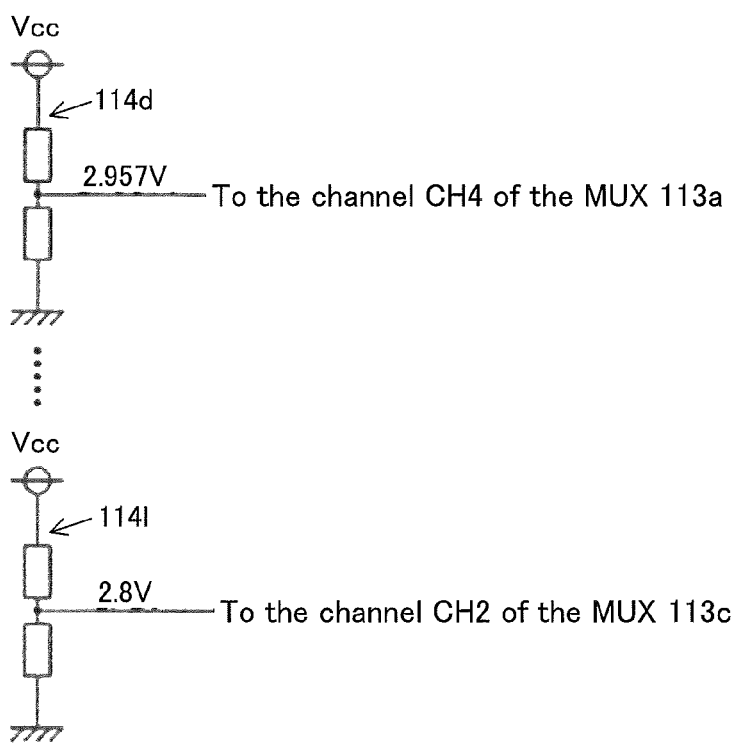
FIG. 6 illustrates configuration examples of a voltage divider circuit to be mounted on the protection circuit of FIG. 5.

In the fourth section, to obtain the predetermined reference voltages, the protection circuit 11 is provided with as many as nine voltage divider circuits, i.e., voltage divider circuits 114d to 114l as illustrated in FIG. 6. For the sake of convenience, FIG. 6 illustrates the voltage divider circuits 114d and 114l only. The voltage divider circuit 114d, which is a resistive voltage divider circuit, obtains its corresponding reference voltage (2.957V, a predetermined voltage for the second temperature sensor 642g, for example) by dividing input constant voltage Vcc with a plurality of resistors. With regard to reference voltages to be obtained by the voltage divider circuits 114e to 114k, see Table 2 below.

TABLE 2

Reference Voltages to be Obtained by the Voltage Divider Circuits

| Voltage Divider Circuit | Reference Voltage Value | Temperature Sensor |
|---|---|---|
| 114d | 2.957 V | Sensor 642g |
| 114e | 0.194 V | Sensor 641e |
| 114f | 0.194 V | Sensor 641e |
| 114g | 0.194 V | Sensor 641d |
| 114h | 2.8 V | Sensor 642f |
| 114i | 2.8 V | Sensor 642h |
| 114j | 0.194 V | Sensor 641f |
| 114k | 0.194 V | Sensor 641e |
| 114l | 2.8 V | Sensor 642f |

The description will continue with reference to FIG. 5 again. In the fourth section, the channels CH1 of the MUXs 113a and 113b are connected to the ground. Constant voltage Vcc is input to the channel CH1 of the MUX 113c. If the channels CH2 to CH4 of the MUXs 113a and 113b were allocated to reference voltages predetermined for the first temperature sensors 641, the free channels CH1 of the MUXs 113a and 113b would be allocated to constant voltage Vcc. If the channels CH2 to CH4 of the MUXs 113a and 113b were allocated to reference voltages predetermined for the second temperature sensors 642, the free channels CH1 of the MUX 113a and 113b would be allocated to voltage to ground.

The channel CH1 of the MUX 113c may be allocated to another voltage than constant voltage Vcc. It is as much as (or approximate to) a reference voltage predetermined for the first temperature sensor 641 or the second temperature sensor 642 to which any of the other channels CH2 to CH4 of the MUX 113c is not allocated (2.975V, a reference voltage predetermined for the second temperature sensor 642g, for example).

Selection signals S1 and S2 output by the controller portion 7 are both input to the MUXs 113a to 113c. The selection signals S1 and S2 each are a binary signal varying between a Hi level and a Lo level. A combination of Hi and Lo levels allows identifying the model as A, B, or C (see Table 3 below).

TABLE 3

Relations between Model and Combination of Selection Signals

| Selection Signal | | Model |
|---|---|---|
| S1 | S2 | |
| Lo | Lo | A |
| Hi | Lo | B |
| Lo | Hi | C |

These combinations of Hi and Lo levels need to be set at the factory prior to shipment of the models A, B, and C. The MUXs 113a to 113c select one of their own channels CH1 to CH4 with reference to a combination of levels indicated by the selection signals S1 and S2, and output reference voltages to which their selected channels are allocated. Since the same channels of the MUXs 113a to 113c are allocated to one specific mode, the MUXs 113a to 113c output suitable reference voltages for one specific model.

The protection circuit 11 is further provided with as many as nine comparators, i.e., comparators 111d to 111l. According to the protection circuit 11, the comparator 111e to 111g, 111i, and 111j are examples as first comparators, and the other comparators 111d, 111h, 111k, and 111l are examples as second comparators. In the fourth section, the second comparator 111d has a non-inverting input terminal (positive terminal) capable of receiving an output reference voltage of the MUX 113a and an inverting input terminal (negative terminal) capable of receiving an output voltage of the second temperature sensor 642g. The second comparator 111d compares the output voltage to the output reference voltage. If the output voltage is greater than the output reference voltage (i.e., in the event of excessive heating), the second comparator 111d outputs a binary signal of a Lo level (i.e., a comparison result); if not, the second comparator 111d outputs a binary signal of a Hi level (i.e., a comparison result). Meanwhile, the first comparator 111e has a non-inverting input terminal capable of receiving an output voltage of the first temperature sensor 641d and an inverting input terminal capable of receiving an output reference voltage of the MUX 113b. The first comparator 111e compares the output voltage to the output reference voltage. If the output voltage is less than the output reference voltage (i.e., in the event of excessive heating), the first comparator 111e outputs a binary signal of a Lo level; if not, the first comparator 111e outputs a binary signal of a Hi level. With regard to the input and output of the other comparators 111f to 111l, see Table 4 below.

TABLE 4

Inputs and Outputs of the Comparators

| Comparator | Type (First Comparator/Second Comparator) | Input Non-inversing Input Terminal (Positive Terminal) | Non-inversing Input Terminal (Negative Terminal) | Output Under Normal Temperature Conditions | In the Event of Excessive Heating |
|---|---|---|---|---|---|
| 111d | First Comparator | MUX113a | Second Temperature Sensor 642a | Hi | Lo |
| 111e | First Comparator | First Temperature Sensor 641d | MUX113b | Hi | Lo |
| 111f | First Comparator | First Temperature Sensor 641f | MUX113c | Hi | Lo |
| 111g | First Comparator | First Temperature Sensor 641d | MUX113a | Hi | Lo |
| 111h | Second Comparator | MUX113b | Second Temperature Sensor 642f | Hi | Lo |
| 111i | First Comparator | First Temperature Sensor 641e | MUX113c | Hi | Lo |
| 111j | First Comparator | First Temperature Sensor 641e | MUX113a | Hi | Lo |
| 111k | Second Comparator | MUX113b | Second Temperature Sensor 642h | Hi | Lo |
| 111l | Second Comparator | MUX113c | Second Temperature Sensor 642f | Hi | Lo |

According to the protection circuit 11, as described above, an output voltage of the second temperature sensor 642 having the second temperature characteristic, such as a NC sensor or a thermopile, is input to an inverting input terminal (negative terminal). An output voltage of the first temperature sensors 641 having the first temperature characteristic, such as a thermistor, is input to a non-inverting input terminal (positive terminal). When the fuser temperature is normal, the comparator 111 outputs a binary signal of a Hi level. In the event of excessive heating, the protection circuit 11 starts protections from excessive heating, and the comparator 111 outputs a binary signal of a Lo level.

The protection circuit 11 is further provided with an OR circuit 112. Receiving a binary signal of a Lo level from at least one of the comparator 111d to 111l, the OR circuit 112 transfers a power-off signal to both the relay control circuit 9 and the heater power circuit 10 illustrated in FIG. 2.

Output voltages of the first temperature sensor 641 and the second temperature sensor 642 are also input to the controller portion 7. With reference to the output voltages of the first temperature sensor 641 and the second temperature sensor 642, the controller portion 7 controls power delivery to the heater 62 to adjust the fuser temperature to a target temperature.

Fifth Section: Operation and Effect of the Protection Circuit

As described above, the protection circuit 11 has a configuration that is capable of being connected to the first temperature sensors 641 and the second temperature sensors 642 that are used in multiple models of the image forming apparatus 1. Specifically, according to the protection circuit 11, an output voltage of the second temperature sensor 642 having the second temperature characteristic, such as a NC sensor and a thermopile, is input to an inverting input terminal (negative terminal) of the second comparator 111d, for example. An output voltage of the first temperature sensor 641 having the first temperature characteristic, such as a thermistor, is input to a non-inverting input terminal (positive terminal) of the first comparator 111e, for example.

Furthermore, according to the protection circuit 11, the same channels of the MUXs 113a to 113c are uniquely (exclusively) allocated to three reference voltages used in one specific model. The MUXs 113a to 113c are configured to output suitable reference voltages for one specific model having this protection circuit 11, with reference to the input selection signals S1 and S2. A reference voltage predetermined for the second temperature sensor 642 having the second temperature characteristic, such as a NC sensor and a thermopile, is input to a non-inverting input terminal (positive terminal) of the second comparator 111d, for example, to which the output voltage of the second temperature sensor 642 is also input. A reference voltage predetermined for the first temperature sensor 641 having the first temperature characteristic, such as a thermistor, is input to an inverting input terminal (negative terminal) of the first comparator 111e, for example, to which the output voltage of the first temperature sensors 641 is also input.

As described above, while successfully protecting the image forming apparatus 1 from excessive heating, the protection circuit 11 on one circuit substrate can be used in multiple models of the image forming apparatus 1. Inventory control for such substrates is not so costly to the manufacturer accordingly.

Hereinafter, an additional technical effect of the protection circuit 11 will be described. According to the protection circuit 11, at least one of the same channels of the MUXs 113a to 113c is allocated to the first temperature sensor 641 having the first temperature characteristic and at least one of the same channels of the MUX 113a to 113c is allocated to the second temperature sensor 642 having the second temperature characteristic, as shown in Table 5 below. The shaded cells in Table 5 indicate the second temperature sensors 642. With regard to the MUX 113a, the channel CH4 is allocated to GND, the channel CH3 is allocated to the first temperature sensor 641e, the channel CH2 is allocated to the first temperature sensor 641d, and the channel CH1 is allocated to the second temperature sensor 642g, for example. With regard to the MUXs 113b and 113c, see Table 5 below. A program may run incorrectly because of a microcomputer malfunction, or there may be a wiring error such as a ground fault or a disconnection. In such cases, the selection signals S1 and S2 can make incorrect logic levels, thus the protection circuit 11 can incorrectly identify the model to select wrong reference voltages. With the above-described channel allocation, however, the protection circuit 11 is allowed to quickly transfer a power-off signal to both the relay control circuit 9 and the heater power circuit 10 illustrated in FIG. 2.

TABLE 5

Temperature Sensors for the Models

| | | Temperature Sensor | | |
|---|---|---|---|---|
| Model | Channel | MUX113a | MUX113b | MUX113c |
| C | CH1 | NC Sensor | Thermopile | Thermistor |
| B | CH2 | Thermistor | Thermopile | Thermistor |
| A | CH3 | NC Sensor | Thermopile | Thermopile |
| N.A. | CH4 | 0 V (GND) | 0 V (GND) | 3.3 V |

For example, the protection circuit 11 can incorrectly identify a model A as a model C, which will be further described hereinafter. In the event of incorrect identification of model, the protection circuit 11 compares an output voltage of the first temperature sensor 641e to a reference voltage predetermined for the second temperature sensor 642g (2.957V), although the protection circuit 11 correctly needed to compare the same to 0.194V. Comparing the same to 2.957V, the comparator 111j outputs a comparison result of Lo while the temperature is actually very low. As a result, the protection circuit 11 transfers a power-off signal to the relay control circuit 9 and the heater power circuit 10 immediately after turn-on of the model A.

According to the protection circuit 11, as described above, at least one of the same channels of the MUX 113a to 113c is allocated to the first temperature sensors 641 and at least one other one of the same channels of the MUX 113a to 113c is allocated to the second temperature sensor 642, and the first temperature sensors 641 and the second temperature sensors 642 are used in one specific model (see Table 1 above). With the above-described channel allocation, however, the protection circuit 11 is allowed to quickly transfer a power-off signal to both the relay control circuit 9 and the heater power circuit 10 illustrated in FIG. 2. For example, the protection circuit 11 can incorrectly identify a model A as a model B, which will be further described hereinafter. In this case, the comparator 111l, instead of the comparator 111j, quickly outputs a comparison result of Lo. As a result, the protection circuit 11 transfers a power-off signal to the relay control circuit 9 and the heater power circuit 10 immediately after turn-on of the model A.

According to the protection circuit 11, one of the same channels of the MUXs 113a to 113c is a free channel, which is allocated to constant voltage Vcc or voltage to ground (0V), as shown in Table 5 above. The channel CH1 of the MUX 113c may be allocated to another voltage than constant voltage Vcc. It is as much as (or approximate to) a reference voltage predetermined for the first temperature sensor 641 or the second temperature sensor 642 (2.975V, a reference voltage of the second temperature sensor 642g, for example) to which any of the other channels CH2 to CH4 of the MUX 113c is not allocated. Also with this configuration, in the event of incorrect identification of model, the protection circuit 11 transfers a power-off signal to the relay control circuit 9 and the heater power circuit 10 immediately after turn-on of the model A.

Table 6 shown below is a table indicating whether the protection circuit 11 is allowed to output a power-off signal immediately after turn-on of the image forming apparatus 1 in the event of incorrect identification of model. Specifically, it is a table indicating comparison results of the comparators 111d to 111l and whether or not to output a power-off signal, for each combination of the actual model having the protection circuit 11 and the incorrect model identified by the protection circuit 11. As understood from Table 6 below, in the event of incorrect identification of model, at least one of the comparators 111d to 111l outputs a comparison result of Lo immediately after turn-on of the image forming apparatus 1, and the protection circuit 11 outputs a power-off signal upon receiving the comparison result. As described above, the protection circuit 11 on one circuit substrate can cause incorrect identification of model, but possesses high reliability enough to solve the problem.

TABLE 6

Whether or Not to Output a Power-off Signal

| Actual Model | Incorrect Model | Output of Comperator(Hi/Lo) | | | | | | | | | Power-off Signal |
|---|---|---|---|---|---|---|---|---|---|---|---|
| | | 111d | 111e | 111f | 111g | 111h | 111i | 111j | 111k | 111l | |
| C | C | Hi | Hi | N.U. | Hi | Hi | N.U. | N.U. | N.U. | N.U. | Not Output |
| B | B | N.U. | Hi | Hi | Hi | Hi | N.U. | Hi | Hi | Hi | Not Output |
| A | A | N.U. | Hi | Hi | Hi | Hi | Hi | Hi | Hi | Hi | Not Output |
| C | B | Lo | Lo | N.D. | N.D. | N.D. | N.D. | N.D. | N.D. | N.D. | Output |
| C | A | Lo | Lo | Lo | Lo | N.D. | N.D. | N.D. | N.D. | N.D. | Output |
| C | N.A. | Lo | N.D. | Lo | N.D. | N.D. | N.D. | N.D. | N.D. | N.D. | Output |
| B | C | N.D. | N.D. | N.D. | N.D. | Lo | N.D. | N.D. | N.D. | Lo | Output |
| B | A | N.D. | Lo | N.D. | N.D. | N.D. | Lo | N.D. | N.D. | N.D. | Output |
| B | N.A. | N.D. | N.D. | N.D. | N.D. | Lo | Lo | N.D. | N.D. | N.D. | Output |
| A | C | N.D. | N.D. | N.D. | N.D. | Lo | N.D. | Lo | Lo | Lo | Output |
| A | B | N.D. | N.D. | N.D. | N.D. | N.D. | N.D. | N.D. | N.D. | Lo | Output |
| A | N.A. | N.D. | N.D. | N.D. | N.D. | Lo | Lo | N.D. | N.D. | Lo | Output |

N.U. indicates "not used".
N.D. indicates "not detected".

Sixth Section: First Variation

Figure 7:
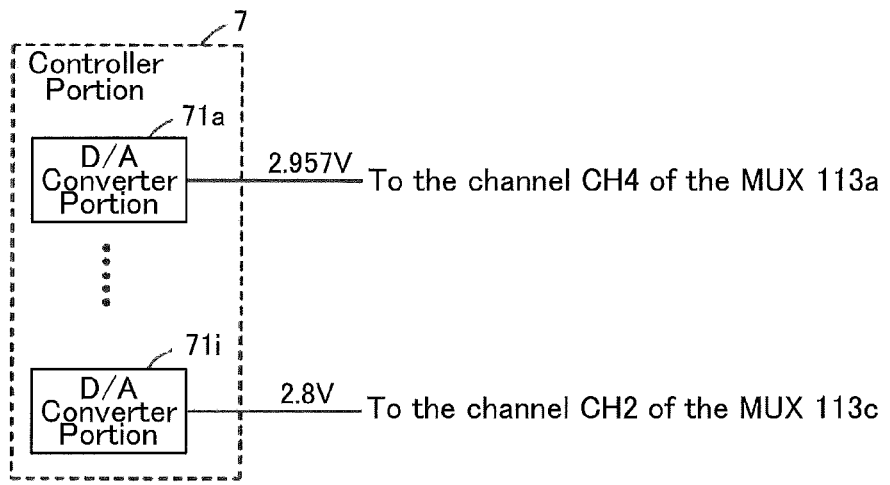
FIG. 7 is a view illustrating a D/A converter portion according to a first variation.

In the description above, reference voltages are obtained by the voltage divider circuits 114d to 114l, some of which are illustrated in FIG. 6. In other words, by obtaining reference voltages with the voltage divider circuits 114d to 114*l* which are hardware components for a specific use, the protection circuit 11 ensures safety and reliability of protection from excessive heating. Reference voltages are not necessarily obtained by the voltage divider circuits 114*d* to 114*l*. Alternatively, reference voltages may be obtained by D/A converter portions 71*a* to 71*i*, which are embedded in the microcomputer of the controller portion 7 as illustrated in FIG. 7. For the sake of convenience, FIG. 7 illustrates the D/A converter portions 71*a* and 71*i* only.

Seventh Section: Second Variation

Figure 8:
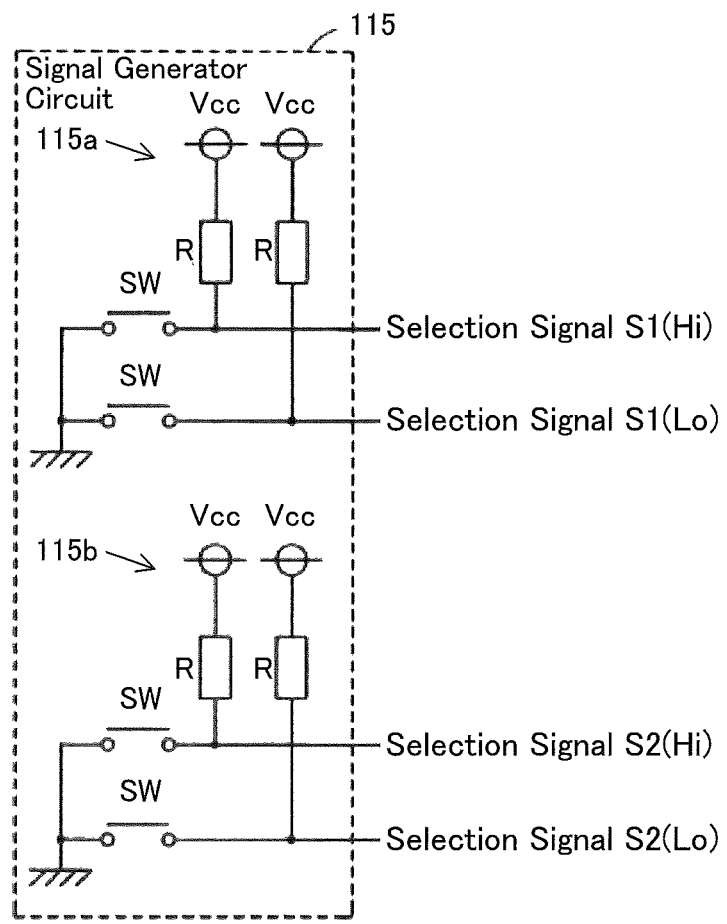
FIG. 8 is a view illustrating a signal generator circuit according to a second variation.

As described above, the selection signals S1 and S2 are generated by the controller portion 7 then input to the MUX 113*a* to 113*c* (see FIG. 5). To improve safety and reliability of protection from excessive heating, the selection signals S1 and S2 may be generated by a signal generator circuit 115, a hardware component for a specific use in the fuser temperature monitoring device 2. The signal generator circuit 115 includes logic circuits 115*a* and 115*b* each having pull-up resistors, as illustrated in FIG. 8. The logic circuits 115*a* and 115*b* need to have their switches SW turned on and off manually, and the signal generator circuit 115 is thus allowed to output a combination of the selection signals S1 and S2 as shown in Table 3 above. The switches SW are shorting bars, DIP switches, or pin jumpers, for example.

Eighth Section: Third Variation

Figure 9:
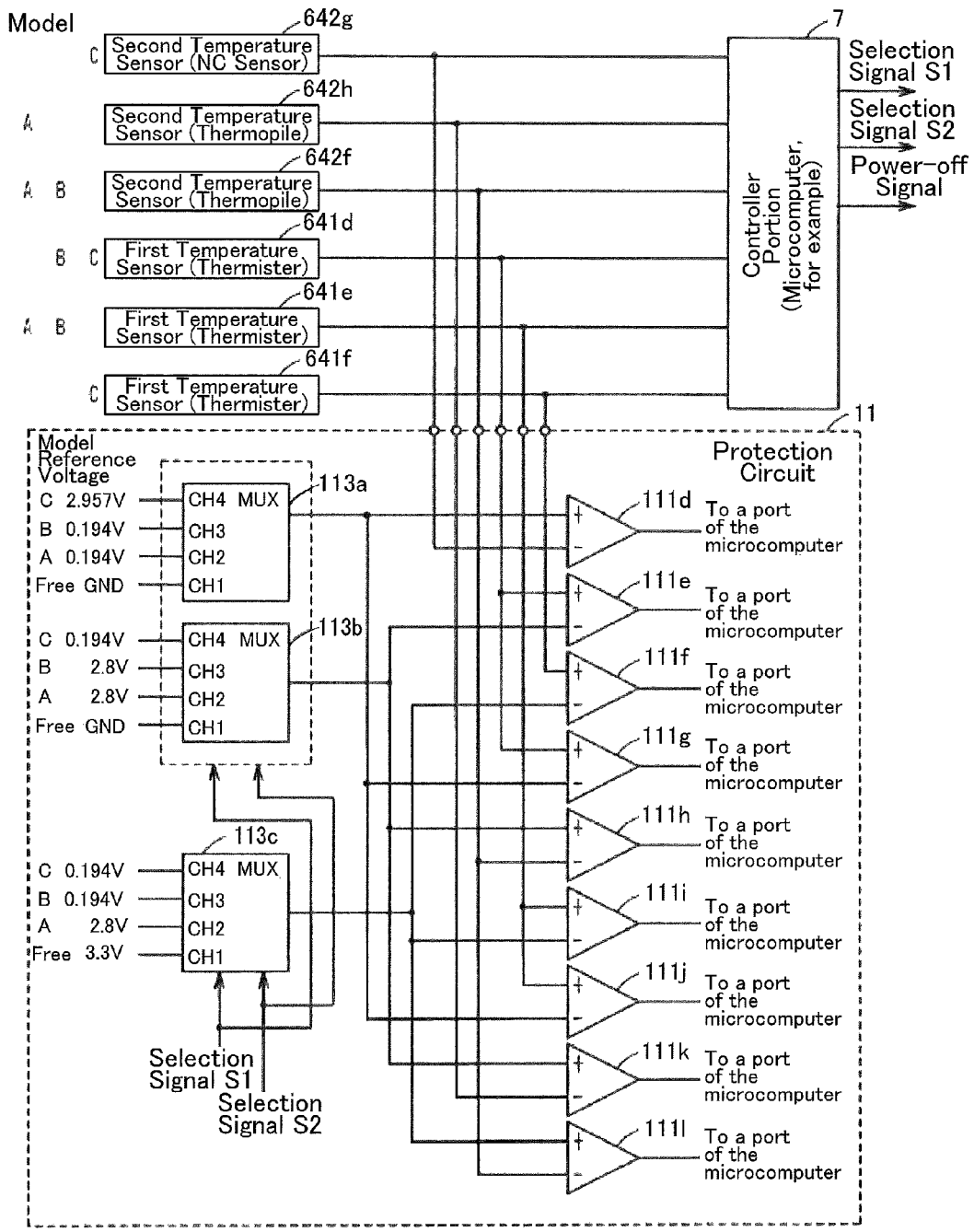
FIG. 9 is a view illustrating a configuration of a protection circuit according to a third variation.

In the description above, the protection circuit 11 ensures safety and reliability of protection from excessive heating by inputting comparison results of the comparators 111*d* to 111*l* to the OR circuit 112. Alternatively, comparison results of the comparators 111*d* to 111*l* may be input to the respective ports of the microcomputer of the controller portion 7 through parallel connections, as illustrated in FIG. 9, such that the controller portion 7 could output a power-off signal depending on the logical sum of the comparison results in accordance with a program. In this case, the comparators 111*d* to 111*l* need to be connected in a one-to-one manner to the temperature sensors 641 and 642, which is different from the fourth variation to be later described. The microcomputer is thus allowed to identify the temperature sensor having detected excessive heating by receiving comparison results. This will improve ease of maintenance of the image forming apparatus 1.

Ninth Section: Forth Variation

Figure 10:
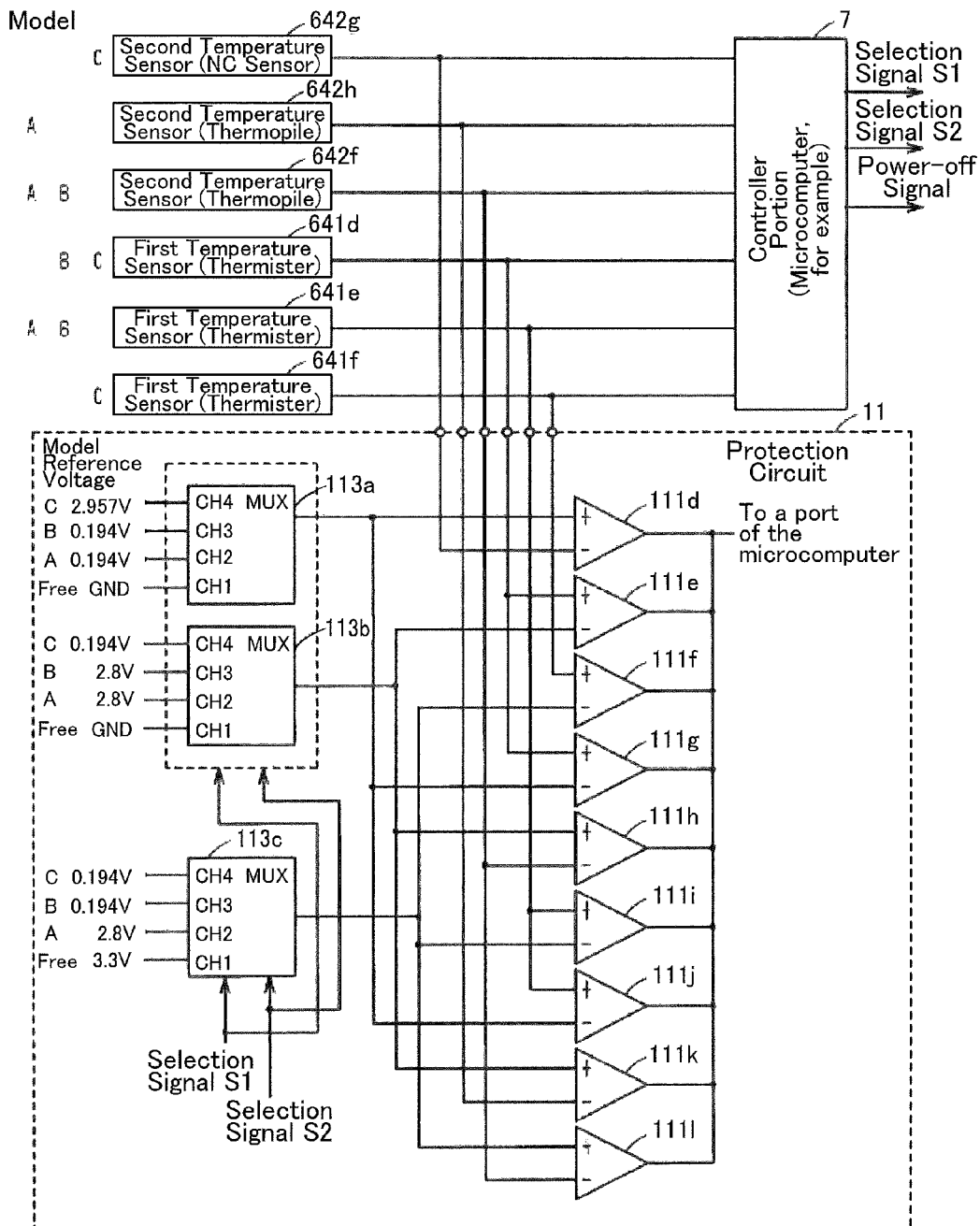
FIG. 10 is a view illustrating a configuration of a protection circuit according to a fourth variation.

Still alternatively, comparison results of the comparators 111*d* to 111*l* may be input to one single port of the microcomputer of the controller portion 7 through a wired OR connection, as illustrated in FIG. 10, such that the controller portion 7 could output a power-off signal depending on the comparison results in accordance with a program. In this case, the comparators 111*d* to 111*l* use only one port, which is different from the third variation described above. The controller portion 7 is thus allowed to have a small microcomputer circuit. This will lead to a reduction in manufacturing costs of the image forming apparatus 1.

In the examples of FIGS. 8 and 9, output voltages of the first temperature sensor 641 and the second temperature sensor 642 and comparison results of the comparators 111*d* to 111*l* are input to one and the same microcomputer. Alternatively, these may be input to different microcomputers.

When many first and second temperature sensors 641 and 642 are needed, the fusing portion 6 is not necessarily provided with them. Alternatively, the image forming apparatus 1 may be provided with them according to a combination of the third variation and the fourth variation.

Tenth Section: Supplemental Description

In the above-described embodiment and variations, the number of the first temperature sensors 641, the number of the second temperature sensors 642, the number of the comparators 111, the number of the MUXs 113, and the numbers of other components are determined as appropriate to the specifications of the image forming apparatus 1 and the fusing portion 6.

INDUSTRIAL APPLICABILITY

An excessive heating protection circuit and an image forming apparatus according to the above-described embodiment and variations are preferred to be used in a copier, a printer, a facsimile, and a multifunctional machine having copier, printer, and facsimile functions.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An excessive heating protection circuit for protecting a fusing portion from excessive heating, the excessive heating protection circuit to be connected to a first temperature sensor and a second temperature sensor, the first temperature sensor being configured to output less voltage with a rise in temperature, the second temperature sensor being configured to output more voltage with a rise in temperature, the excessive heating protection circuit comprising:
- a multiplexer having a plurality of channels, the channels being capable of receiving reference voltages predetermined for the first temperature sensor and the second temperature sensor, the multiplexer being configured to output one of the reference voltages by selecting one of the channels with reference to input selection signals;
- a first comparator having a first non-inverting input terminal being capable of receiving the output voltage of the first temperature sensor and a first inverting input terminal being capable of receiving the output reference voltage of the multiplexer, the first comparator being configured to compare the output voltage of the first temperature sensor to the output reference voltage of the multiplexer and to output a comparison result; and
- a second comparator having a second inverting input terminal being capable of receiving the output voltage of the second temperature sensor and a first non-inverting input terminal being capable of receiving the output reference voltage of the multiplexer, the second comparator being configured to compare the output voltage of the second temperature sensor to the output reference voltage of the multiplexer and to output a comparison result, wherein the comparison result output by the first comparator and the comparison result output by the second comparator both indicate Hi under normal temperature conditions and both indicate Lo in the event of excessive heating.

2. The excessive heating protection circuit according to claim 1, comprising a plurality of the multiplexers, wherein:
- the channels of each multiplexer include at least one first channel and at least one second channel such that the first channels of the multiplexers are the same channels and the second channels of the multiplexers are the same channels, the at least one first channel being capable of receiving the reference voltage predetermined for the first temperature sensor, the at least one second channel being capable of receiving the reference voltage predetermined for the second temperature sensor; and
- the multiplexers are configured to select one of their own channels with reference to the same input selection signals such that the channels selected by the multiplexers with reference to the same input selection signals are the same channels.

3. The excessive heating protection circuit according to claim 2, wherein:
- the channels of each multiplexer include a free channel not allocated to the reference voltage predetermined for the first temperature sensor or the second temperature sensor; and
- the free channel is then allocated to voltage as much as a reference voltage predetermined for another first temperature sensor than the first temperature sensor or another second temperature sensor than the second temperature sensor.

4. The excessive heating protection circuit according to claim 2, wherein:
- the channels of each multiplexer include a free channel not allocated to the reference voltage predetermined for the first temperature sensor or the second temperature sensor; and
- the free channel is then allocated to constant voltage when the channels of each multiplexer includes a channel allocated to the reference voltage predetermined for the first temperature sensor, or the free channel is then allocated to voltage to ground when the channels of each multiplexer includes a channel allocated to the reference voltage predetermined for the second temperature sensor.

5. The excessive heating protection circuit according to claim 1, further comprising a voltage divider circuit, the voltage divider circuit being configured to obtain reference voltage to input to the multiplexer.

6. The excessive heating protection circuit according to claim 1, further comprising a D/A converter portion, the D/A converter portion being configured to obtain reference voltage to input to the multiplexer.

7. The excessive heating protection circuit according to claim 1, further comprising a processor portion, the processor portion being allowed to output the selection signal.

8. The excessive heating protection circuit according to claim 1, further comprising a signal generator circuit, the signal generator circuit being configured to generate the selection signal with reference to input constant voltage.

9. The excessive heating protection circuit according to claim 1, further comprising a processor portion having a microcomputer, the processor portion being configured to receive the comparison results from the first comparator and the second comparator separately through parallel connections and to judge whether or not the fusing portion is excessively heated with reference to the comparison results received.

10. The excessive heating protection circuit according to claim 1, further comprising a processor portion having a microcomputer, the microcomputer being configured to receive the comparison results from the first comparator and the second comparator through a wired OR connection, wherein the processor portion is configured to judge whether or not the fusing portion is excessively heated with reference to the comparison results received.

11. An image forming apparatus comprising an excessive heating protection circuit for protecting a fusing portion from excessive heating, the excessive heating protection circuit to be connected to a first temperature sensor and a second temperature sensor, the first temperature sensor being configured to output less voltage with a rise in temperature, the second temperature sensor being configured to output more voltage with a rise in temperature, the excessive heating protection circuit comprising:
- a multiplexer having a plurality of channels, the channels being capable of receiving reference voltages predetermined for the first temperature sensor and the second temperature sensor, the multiplexer being configured to output one of the reference voltages by selecting one of the channels with reference to input selection signals;
- a first comparator having a first non-inverting input terminal being capable of receiving the output voltage of the first temperature sensor and a first inverting input terminal being capable of receiving the output reference voltage of the multiplexer, the first comparator being configured to compare the output voltage of the first temperature sensor to the output reference voltage of the multiplexer and to output a comparison result; and
- a second comparator having a second inverting input terminal being capable of receiving the output voltage of the second temperature sensor and a second non-inverting input terminal being capable of receiving the output reference voltage of the multiplexer, the second comparator being configured to compare the output voltage of the second temperature sensor to the output reference voltage of the multiplexer and to output a comparison result, wherein the comparison result output by the first comparator and the comparison result output by the second comparator both indicate Hi under normal temperature conditions and both indicate Lo in the event of excessive heating.

12. The image forming apparatus according to claim 11, wherein:
the excessive heating protection circuit comprises a plurality of the multiplexers;
the channels of each multiplexer include at least one first channel and at least one second channel such that the first channels of the multiplexers are the same channels and the second channels of the multiplexers are the same channels, the at least one first channel being capable of receiving the reference voltage predetermined for the first temperature sensor, the at least one second channel being capable of receiving the reference voltage predetermined for the second temperature sensor; and
the multiplexers are configured to select one of their own channels with reference to the same input selection signals such that the channels selected by the multiplexers with reference to the same input selection signals are the same channels.

13. The image forming apparatus according to claim 12, wherein:
the channels of each multiplexer include a free channel not allocated to the reference voltage predetermined for the first temperature sensor or the second temperature sensor; and
the free channel is then allocated to voltage as much as a reference voltage predetermined for another first temperature sensor than the first temperature sensor or another second temperature sensor than the second temperature sensor.

14. The image forming apparatus according to claim 12, wherein:
the channels of each multiplexer include a free channel not allocated to the reference voltage predetermined for the first temperature sensor or the second temperature sensor; and
the free channel is then allocated to constant voltage when the channels of each multiplexer includes a channel allocated to the reference voltage predetermined for the first temperature sensor, or the free channel is then allocated to voltage to ground when the channels of each multiplexer includes a channel allocated to the reference voltage predetermined for the second temperature sensor.

15. The image forming apparatus according to claim 11, wherein the excessive heating protection circuit further comprises a processor portion, the processor portion being allowed to output the selection signal.

16. The image forming apparatus according to claim 11, wherein the excessive heating protection circuit further comprises a signal generator circuit, the signal generator circuit being configured to generate the selection signal with reference to input constant voltage.

17. The image forming apparatus according to claim 11, wherein:
the excessive heating protection circuit further comprises a processor portion having a microcomputer, the processor portion being configured to receive the comparison results from the first comparator and the second comparator separately through parallel connections and to judge whether or not the fusing portion is excessively heated with reference to the comparison results received.

18. The image forming apparatus according to claim 11, wherein the excessive heating protection circuit further comprises a voltage divider circuit, the voltage divider circuit being configured to obtain reference voltage to input to the multiplexer.

19. The image forming apparatus according to claim 11, wherein the excessive heating protection circuit further comprises a D/A converter portion, the D/A converter portion being configured to obtain reference voltage to input to the multiplexer.

20. The image forming apparatus according to claim 11, wherein:
the excessive heating protection circuit further comprises a processor portion having a microcomputer, the microcomputer being configured to receive the comparison results from the first comparator and the second comparator through a wired OR connection; and
the processor portion is configured to judge whether or not the fusing portion is excessively heated with reference to the comparison results received.

\* \* \* \* \*